Feb. 10, 1925.  
E. L. GILMORE  
FISHHOOK  
Filed March 6, 1924  
1,526,133
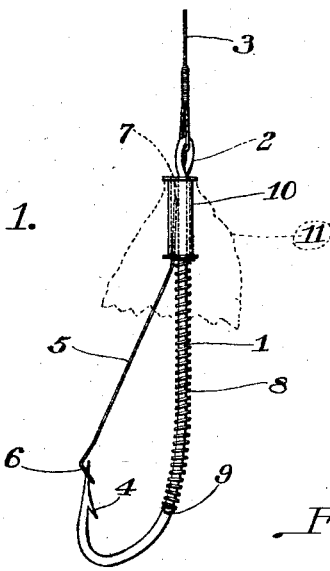
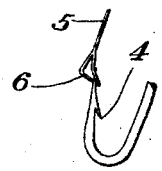
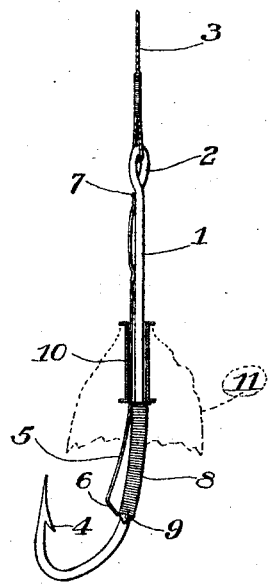
WITNESSES
INVENTOR  
Edward L. Gilmore  
by Winter & Brown  
his Attorneys Patented Feb. 10, 1925.

1,526,133

UNITED STATES PATENT OFFICE.

EDWARD L. GILMORE, OF YOUNGSTOWN, OHIO.

FISHHOOK.

Application filed March 6, 1924. Serial No. 697,230.

*To all whom it may concern:*

Be it known that I, EDWARD L. GILMORE, a citizen of the United States, and a resident of Youngstown, in the county of Mahoning and State of Ohio, have invented a new and useful Improvement in Fishhooks, of which the following is a specification.

This invention relates to fish hooks. More particularly it relates to fish hooks having an attached weed guard, and to means for moving the guard when a fish strikes.

The objects of the invention are to provide a weed guard for fish hooks that will be in operative position normally but which will be positively moved out of guarding position by relative movement of the hook and lure. This is secured by means of a slidable member mounted on the hook shank and adapted to move upon and depress the weed guard when the lure is moved relative to the hook, or vice versa.

In the drawings Fig. 1 is a side view of a hook embodying my invention, the parts being in normal position with the guard applied; Fig. 2 is a partial section showing the parts in relative position with the guard depressed; and Fig. 3 is an enlarged partial view showing details of the guard member.

In fishing it is frequently desirable to protect the point of the hook from weeds, floating leaves, and other small objects in the water. Particularly is this true where the hook is cast near weedy banks, etc. Guards for hooks for this general purpose are old and well known, but so far as I know the structure herein described and claimed is new in that the guard is depressed by movement of the hook in a slidable lure-carrying member mounted on the shank of the hook over the guard, the sliding movement being caused by strike of the fish.

In the drawings there is shown a fish hook having a shank 1, eye 2 for attachment to a line 3, and a barb 4. A weed guard 5 has a terminal diamond-shaped loop 6 adapted to protect the point of the hook and has its other end soldered or otherwise attached to the shank of the hook at the point 7 as indicated. A coil spring 8 surrounds the shank 1, being attached thereto at 9, and having its other end attached to a sleeve member 10, loosely mounted on the shank, and large enough to slide over the weed guard 5 and the shank of the hook. A lure 11 of any desired form, as for example feathers, spinner, artificial minnow, etc., is attached to the sleeve 10, as indicated in dotted lines in the drawings.

The guard 5 is made of spring wire. The portion of it next the point of attachment 7 lies parallel to the shank of the hook, and the sleeve 10 normally rests over this straight portion in the position shown in Fig. 1. Below the sleeve the guard is bent outward, so that its terminal loop 6 normally bears under spring pressure against the inner side of the point of the hook, the outwardly bent corners of the loop shielding the point as shown in Fig. 3. Movement of the sleeve on the hook must therefore overcome resistance both of the spring 8 and of the guard itself as the sleeve rides on the inclined portion of it and depresses the guard to the position shown in Fig. 2.

The operation is as follows: The lure-carrying sleeve 10 is normally held in the position shown in Fig. 1 by spring 8. The weed guard 5 is of spring wire and normally its free end bears on the inner end of the hook as shown in Fig. 1, the raised corners of the diamond-shaped bent loop 6 projecting laterally upward and protecting the point of the hook. But when a fish seizes the lure 11 the sleeve 10 is caused to slide on the shank 1, the hook moving forward by pull of the line 3. Consequently this overcomes resistance of the resilient guard 5, and coil spring 8 depressing the weed guard as the sleeve moves to the position shown in Fig. 2. The point of the hook is thus instantly exposed upon any relative opposite movement of the hook and lure and the hook point placed in position to pierce the fish's mouth. The coil spring 8 surrounds the shank of the hook and prevents the jaws of the fish from closing on the shank in a place that would prevent the movement of the sleeve thereon.

The advantages of this arrangement will be apparent to experienced fishermen.

I claim:

1. The combination with a fish hook of a weed guard rigidly attached to the shank of the hook at one end and normally shielding the point of the hook at the other end, a lure-carrying sleeve mounted on the shank of the hook and adapted to slide thereon by depressing the weed guard.

2. The combination with a fish hook of a weed guard rigidly attached to the shank of the hook at one end and normally extending to and shielding the point of the hook at the other end, a lure-carrying sleeve mounted on the shank of the hook and adapted to slide thereon by depressing the weed guard, and a resilient member constantly urging the sleeve away from the weed guard.

3. The combination with a fish hook of a weed guard comprising a resilient spring steel member rigidly attached at one end to the shank of the hook, its other end being formed into a loop adapted to bear on the inner side of the hook near its point and to shield the point, and a slidable lure-carrying member mounted on the shank of the hook and adapted to depress the weed guard upon relative longitudinal movement of the hook or lure-carrying member.

4. The combination with a fish hook of a weed guard carried by the shank of the hook at one end and normally shielding the point of the hook at the other end, a lure-carrying sleeve mounted on the shank of the hook and adapted to slide thereon by depressing the weed guard, and a coiled spring surrounding the shank and attached thereto at its end nearest the point of the hook, the other end of the spring bearing against the sleeve and normally preventing it from sliding over the weed guard.

5. The combination with a fish hook of a weed guard, rigidly attached to the shank of the hook at one end and normally shielding the point of the hook at the other end, a lure-carrying sleeve mounted on the shank of the hook and adapted to slide thereon by depressing the weed guard, and means to normally prevent the sleeve from depressing the weed guard.

6. The combination with a fish hook of a resilient weed guard attached to the hook shank at one end and inclined from said shank to and bearing upon the inner side of the hook near its point at the other end, and adapted to screen the point, and means to depress the weed guard, said means comprising a slidable lure-carrying member mounted on the shank of the hook in position to ride upon the inclined portion of the guard and adapted to be moved by the striking of a fish.

7. The combination with a fish hook of a weed guard comprising a resilient spring member attached to the shank of the hook at one end and having its other end formed to screen the point of the hook and normally bearing against the inner side of the hook near the point, and a slidable member mounted on the shank of the hook for depressing the guard and adapted to be actuated by relative longitudinal movement of the hook and a lure-carrying member mounted thereon.

8. The combination with a fish hook of a resilient spring guard member attached to the hook at one end, having the portion of its body adjacent the point of attachment positioned parallel with the hook shank and another portion of its body inclined outward from the hook shank to bear against the inner face of the hook near its point and adapted to screen the point, and a lure-carrying sleeve slidably mounted on the hook shank and normally positioned over the hook shank and parallel portion of the guard member, whereby to depress the guard by relative longitudinal movement of the hook or sleeve.

9. The combination with a fish hook of a resilient spring guard member attached to the hook at one end, having the portion of its body adjacent the point of attachment positioned parallel with the hook shank and another portion of the body inclined outward from the hook shank to bear against the inner face of the hook near its point and adapted to screen the point, a lure-carrying sleeve slidably mounted on the hook shank and normally positioned over the hook shank and parallel portion of the guard member, and a coil spring surrounding the hook shank and urging the sleeve away from the inclined portion of the guard.

In testimony whereof, I sign my name.

EDWARD L. GILMORE.